United States Patent
Tsang et al.

(10) Patent No.: US 12,271,019 B2
(45) Date of Patent: Apr. 8, 2025

(54) BACKLIGHT MODULE

(71) Applicant: Coretronic Corporation, Hsin-Chu (TW)

(72) Inventors: Chih-Jen Tsang, Hsin-Chu (TW); Chung-Wei Huang, Hsin-Chu (TW); Shih-Yen Cheng, Hsin-Chu (TW); Jung-Wei Chang, Hsin-Chu (TW); Han-Yuan Liu, Hsin-Chu (TW); Chun-Wei Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/479,823

(22) Filed: Oct. 2, 2023

(65) Prior Publication Data

US 2024/0126002 A1     Apr. 18, 2024

(30) Foreign Application Priority Data

Oct. 18, 2022  (CN) .......................... 202222739991.8

(51) Int. Cl.
*F21V 8/00* (2006.01)
*G02F 1/1335* (2006.01)
*G02F 1/13357* (2006.01)

(52) U.S. Cl.
CPC ......... *G02B 6/0053* (2013.01); *G02B 6/0051* (2013.01); *G02B 6/0088* (2013.01); *G02B 6/0038* (2013.01); *G02F 1/133607* (2021.01); *G02F 1/133615* (2013.01)

(58) Field of Classification Search
CPC .. G02B 6/0053; G02B 6/0051; G02B 6/0088; G02B 6/0038; G02F 1/133607; G02F 1/133615
See application file for complete search history.

(56) References Cited

U.S. PATENT DOCUMENTS

| | | | |
|---|---|---|---|
| 11,029,462 B2* | 6/2021 | Chen | G02B 6/0038 |
| 11,852,859 B2* | 12/2023 | Shiau | G02B 6/0038 |
| 11,966,071 B2* | 4/2024 | Yagi | G02B 6/0075 |
| 12,085,803 B2* | 9/2024 | Shiau | G02F 1/133615 |

(Continued)

FOREIGN PATENT DOCUMENTS

| | | |
|---|---|---|
| CN | 112987381 | 6/2021 |
| CN | 213517809 | 6/2021 |

(Continued)

*Primary Examiner* — Arman B Fallahkhair
(74) *Attorney, Agent, or Firm* — JCIPRNET (57) ABSTRACT

A backlight module includes a light source, a first prism sheet disposed on the light source, and a light type adjustment sheet disposed on a side of the first prism sheet away from the light source and including a base and multiple light type adjustment structures. The multiple light type adjustment structures are disposed on the first surface of the base. Each light type adjustment structure has a first structure surface and a second structure surface connected to each other. The first structure surface of each light type adjustment structure and the first surface of the base form a first base angle therebetween, and the second structure surface of each light type adjustment structure and the first surface of the base form a second base angle therebetween. The angle of the first base angle is different from the angle of the second base angle.

22 Claims, 7 Drawing Sheets

(56) References Cited

U.S. PATENT DOCUMENTS

| | | | |
|---|---|---|---|
| 2023/0296821 A1* | 9/2023 | Yagi | G02B 6/0048 |
| 2023/0417978 A1* | 12/2023 | Kanbayashi | G02B 6/0053 |
| 2024/0126002 A1* | 4/2024 | Tsang | G02B 6/0053 |

FOREIGN PATENT DOCUMENTS

| | | |
|---|---|---|
| TW | 201031969 | 9/2010 |
| TW | I615659 | 2/2018 |
| TW | I676067 | 11/2019 |
| TW | I768353 | 6/2022 |

* cited by examiner

BACKLIGHT MODULE

CROSS-REFERENCE TO RELATED APPLICATION

This application claims the priority benefit of China application serial no. 202222739991.8, filed on Oct. 18, 2022. The entirety of the above-mentioned patent application is hereby incorporated by reference herein and made a part of this specification.

BACKGROUND

Technical Field

The disclosure relates to an optical module, and in particular, to a backlight module.

Description of Related Art

Louver film is the mainstream of the existing passive viewing angle adjustment light control technology. The louver film may block the light beam with a large viewing angle by using the blocking characteristics of its own structure, so as to achieve the effect of controlling the viewing angle. The use of louver film may be very effective in producing symmetrical viewing angles and limiting the viewing angles within a certain range. In order to achieve the function of asymmetric viewing angle deflection using the louver film, the geometric shape and the height configuration of the light-shielding structure of the louver film need to be adjusted to achieve an asymmetrical viewing angle. However, even if an asymmetric viewing angle may be achieved by using a louver film with a special light-shielding structure, the light-shielding structure of the louver film will block and/or absorb the light beam, resulting in light loss.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a backlight module, which may adjust the viewing angle and reduce light loss.

Other purposes and advantages of the disclosure may be further understood from the disclosed technical characteristics of the disclosure.

In order to achieve one or part or all of the above purposes or other purposes, the disclosure provides a backlight module including a light source, a first prism sheet disposed on the light source, and a light type adjustment sheet disposed on a side of the first prism sheet away from the light source and including a base and multiple light type adjustment structures. The base has a first surface away from the light source and a second surface close to the light source. The multiple light type adjustment structures are disposed on the first surface of the base. Each light type adjustment structure has a first structure surface and a second structure surface connected to each other. The first structure surface of each light type adjustment structure and the first surface of the base form a first base angle therebetween, and the second structure surface of each light type adjustment structure and the first surface of the base form a second base angle therebetween. The angle of the first base angle is different from the angle of the second base angle.

Based on the above, the backlight module of the embodiment of the disclosure uses the combination of the first prism sheet and the light type adjustment sheet to direct the light beam to a specific direction, so as to achieve the function of adjusting the viewing angle. In particular, the first prism sheet and the light type adjustment sheet use the refraction of the light beam to achieve the purpose of adjusting the viewing angle without using a light-shielding structure. Therefore, while adjusting the viewing angle by using the first prism sheet and the light type adjustment sheet, the brightness of the backlight module is not significantly lost, and the problem of large chromaticity shift is unlikely to occur.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
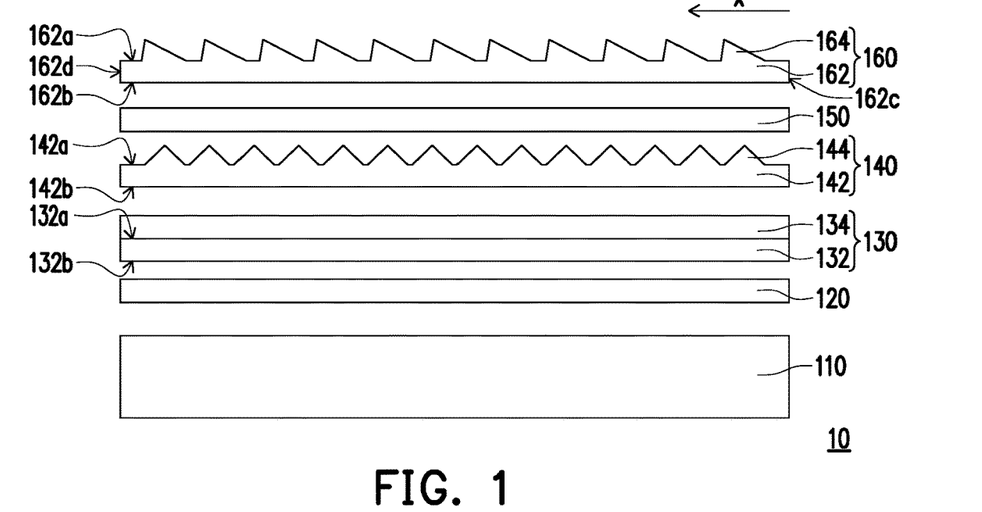
FIG. 1 is a schematic cross-sectional view of a backlight module according to the first embodiment of the disclosure.

FIG. 1 is a schematic cross-sectional view of a backlight module according to the first embodiment of the disclosure. Referring to FIG. 1, a backlight module 10 includes a light source 110. The light source 110 is a surface light source. For example, in the embodiment, the light source 110 may include a light guide plate and a light emitting element disposed on a side of the light guide plate. That is to say, in the embodiment, the backlight module 10 may be an edge type backlight module. However, the disclosure is not limited thereto, and according to other embodiments, the backlight module 10 may also be a direct type backlight module.

The backlight module 10 further includes a first prism sheet 140 disposed on the light source 110. In the embodiment, the first prism sheet 140 includes a first base 142 and multiple first prism structures 144. The first base 142 has a first surface 142a away from the light source 110 and a second surface 142b close to the light source 110, and the multiple first prism structures 144 are disposed on the first surface 142a of the first base 142. In short, in the embodiment, the first prism sheet 140 may be a positive prism sheet.

The backlight module 10 further includes a light type adjustment sheet 160 disposed on a side of the first prism sheet 140 away from the light source 110. The light type adjustment sheet 160 includes a base 162 and multiple light type adjustment structures 164. The base 162 has a first surface 162a away from the light source 110 and a second surface 162b close to the light source 110. The multiple light type adjustment structures 164 are disposed on the first surface 162a of the base 162.

Figure 2:
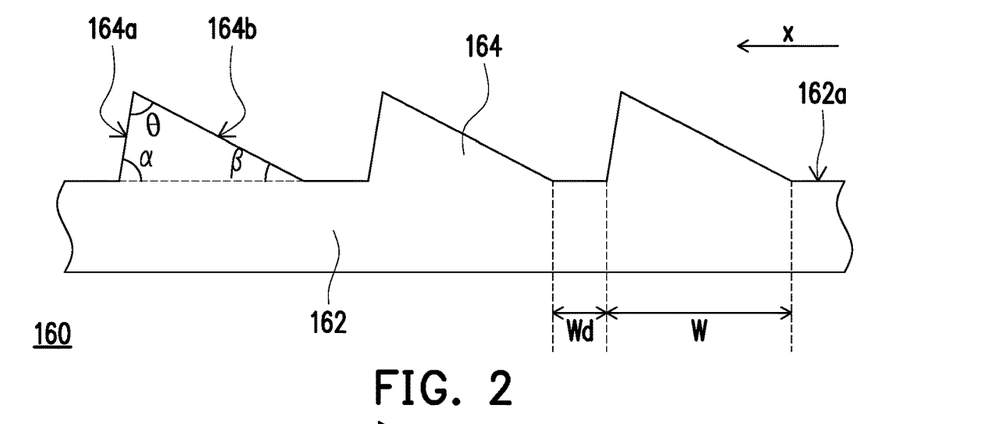
FIG. 2 is a partially enlarged schematic view of a light type adjustment sheet according to the first embodiment of the disclosure.

FIG. 2 is a partially enlarged schematic view of a light type adjustment sheet according to the first embodiment of the disclosure. Referring to FIG. 1 and FIG. 2, each light type adjustment structure 164 has a first structure surface 164a and a second structure surface 164b connected to each other. The first structure surface 164a of each light type adjustment structure 164 and the first surface 162a of the base 162 form a first base angle $\alpha$ therebetween, and the second structure surface 164b of each light type adjustment structure 164 and the first surface 162a of the base 162 form a second base angle $\beta$ therebetween. The angle of the first base angle $\alpha$ is different from the angle of the second base angle $\beta$. That is to say, each light type adjustment structure 164 is a side-by-side prism structure composed of two inclined planes with different degrees of inclination.

Figure 3:
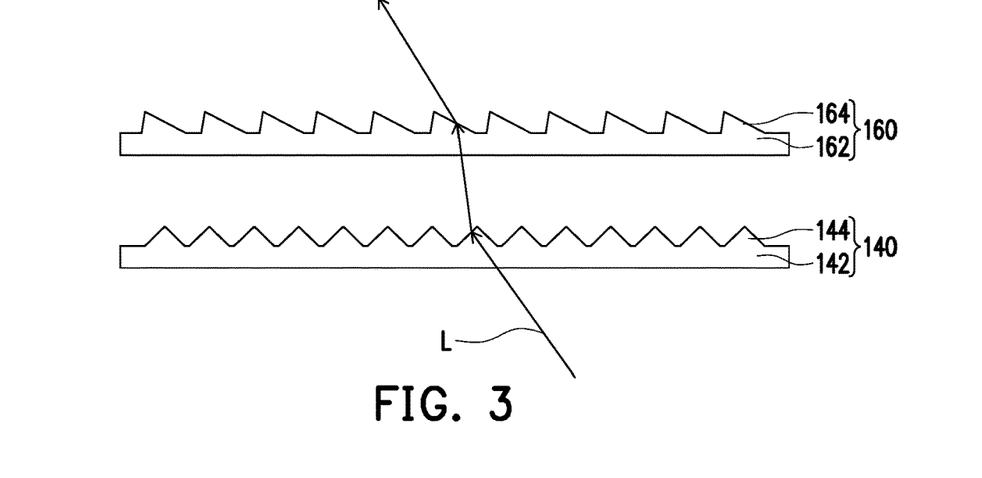
FIG. 3 shows a light path passing through a first prism sheet and a light type adjustment sheet according to the first embodiment of the disclosure.

FIG. 3 shows a light path passing through a first prism sheet and a light type adjustment sheet according to the first embodiment of the disclosure. Referring to FIG. 1 and FIG. 3, the light source 110 is used to emit a light beam L, the first prism sheet 140 first guides the light beam L to the front viewing direction, and the light type adjustment sheet 160 adjusts the deflection of the light beam L, so that the light beam L is deflected to a specific side (such as, but not limited to, the left side, that is, the direction of one side of the first base angle $\alpha$ having a larger angle among the base angles of the deflection light type adjustment structure 164), so as to achieve the function of adjusting the viewing angle. Different from conventional viewing angle control sheets, such as a louver film, the first prism sheet 140 and the light type adjustment sheet 160 use the refraction of the light to adjust the viewing angle without using a light-shielding structure. Therefore, while using the combination of the first prism sheet 140 and the light type adjustment sheet 160 to adjust the viewing angle, the brightness of the backlight module 10 is not significantly lost, and the problem of large chromaticity shift is unlikely to occur.

Referring to FIG. 2, in the embodiment, the angle of the second base angle $\beta$ is smaller than the angle of the first base angle $\alpha$, and a first projected area of the first structure surface 164a of the light type adjustment structure 164 on the first surface 162a of the base 162 is smaller than a second projected area of the second structure surface 164b of the light type adjustment structure 164 on the first surface 162a of the base 162.

In the embodiment, the angle of the first base angle $\alpha$ is in a range of 70° to 90°, and the angle of the second base angle $\beta$ is in a range of 10° to 30°. Preferably, the angle of the first base angle $\alpha$ is substantially equal to 87°, and the angle of the second base angle $\beta$ is substantially equal to 23°, but the disclosure is not limited thereto. In addition, in the embodiment, the first structure surface 164a and the second structure surface 164b form a first vertex angle $\theta$ therebetween, and the angle of the first vertex angle $\theta$ is in a range of 60° to 100°. Preferably, the first vertex angle $\theta$ is substantially equal to 70°, but the disclosure is not limited thereto.

Referring to FIG. 1 and FIG. 2, in the embodiment, the base 162 of the light type adjustment sheet 160 has two ends 162c and 162d opposite to each other. A direction x is directed from the end 162c of the base 162 to the opposite end 162d, and the multiple light type adjustment structures 164 are arranged with a distance Wd in the direction x. When there is the distance Wd between the light type adjustment structures 164, the brightness of the front viewing angle of the backlight module may be improved. In addition, by adjusting the distance Wd to an appropriate size, a part of the light beam may not be deflected to a specific direction when passing through the light type adjustment sheet 160, thereby maximizing the front viewing brightness of the backlight module 10. However, the disclosure is not limited thereto, and in another embodiment, the multiple light type adjustment structures 164 are arranged adjacent to, and in contact with, each other in the direction x, that is, there is no distance Wd between the multiple light type adjustment structures 164.

Referring to FIG. 2, for example, in the embodiment, preferably, each light type adjustment structure 164 has a width W in the direction x, and the ratio of the distance Wd to the width W is in a range of 0 to 1. More preferably, the ratio of the distance Wd to the width W may be substantially equal to 0.2, but the disclosure is not limited thereto. In addition, in the embodiment, preferably, the width W of each light type adjustment structure 164 is between 40 µm and 150 µm, and more preferably, the width W of each light type adjustment structure 164 is substantially equal to 88 µm, but the disclosure is not limited thereto.

Figure 4:
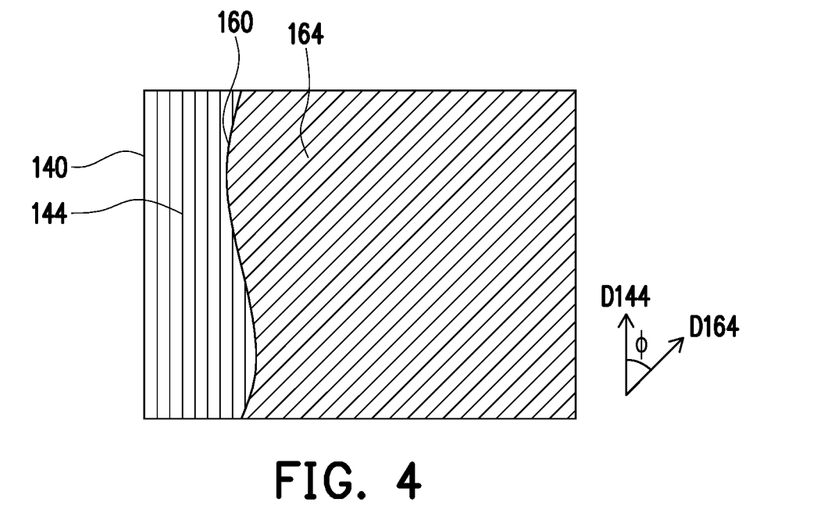
FIG. 4 is a schematic top view of a first prism sheet and a light type adjustment structure according to the first embodiment of the disclosure.

FIG. 4 is a schematic top view of a first prism sheet and a light type adjustment structure according to the first embodiment of the disclosure. Referring to FIG. 1 and FIG. 4, in the embodiment, an extending direction D144 of the multiple first prism structures 144 of the first prism sheet 140 and an extending direction D164 of the multiple light type adjustment structures 164 of the light type adjustment sheet 160 form a first included angle $\varphi$ therebetween, and the angle of the first included angle $\varphi$ is in a range of 0° to 180°. For example, in the embodiment, preferably, the first included angle $\varphi$ is substantially equal to 45°, but the disclosure is not limited thereto. In FIG. 4, in order to facilitate the presentation of the extending direction D144 of the first prism structure 144 and the extending direction D164 of the light type adjustment structure 164, only part of the light type adjustment sheet 160 is drawn in the top view. However, during actual assembly, the first prism sheet 140 and the light type adjustment sheet 160 should almost completely overlap.

Referring to FIG. 1, in the embodiment, the backlight module 10 may optionally include a second prism sheet 130 disposed between the first prism sheet 140 and the light source 110. The second prism sheet 130 is used so as to more effectively converge the light beam and adjust the viewing angle. The second prism sheet 130 includes a second base 132 and multiple second prism structures 134. The second base 132 has a first surface 132a away from the light source 110 and a second surface 132b close to the light source 110, and the multiple second prism structures 134 are disposed on the first surface 132a of the second base 132. That is to say, in the embodiment, the second prism sheet 130 may be a positive prism sheet, but the disclosure is not limited thereto.

Figure 5:
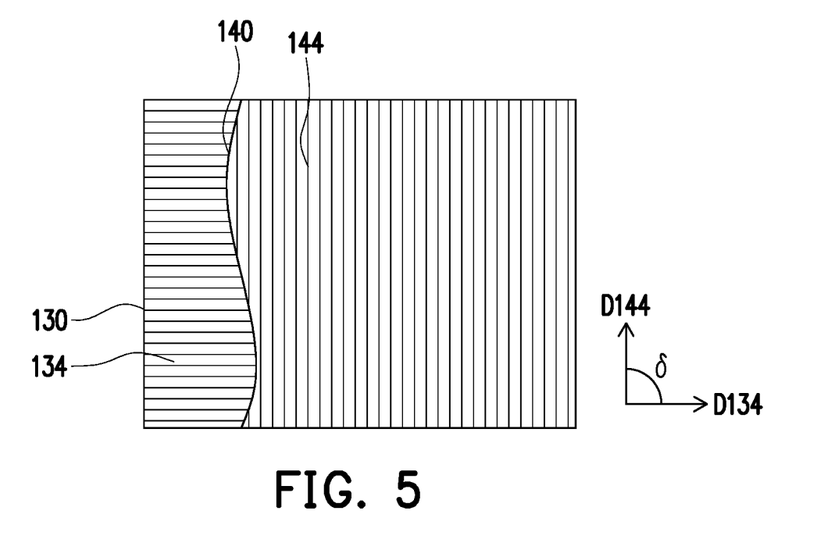
FIG. 5 is a schematic top view of a first prism sheet and a second prism sheet according to the first embodiment of the disclosure.

FIG. 5 is a schematic top view of a first prism sheet and a second prism sheet according to the first embodiment of the disclosure. Referring to FIG. 1 and FIG. 5, in the embodiment, the extending direction D144 of the multiple first prism structures 144 of the first prism sheet 140 and an extending direction D134 of the multiple second prism structures 134 of the second prism sheet 130 form a second included angle $\delta$ therebetween, and the angle of the second included angle $\delta$ is between 0° and 180°. For example, in the embodiment, preferably, the second included angle $\delta$ is substantially equal to 90°, but the disclosure is not limited thereto. In FIG. 5, in order to facilitate the presentation of the extending direction D144 of the first prism structure 144 and the extending direction D134 of the second prism structure 134, only part of the first prism sheet 140 is drawn in the top view. However, during actual assembly, the first prism sheet 140 and the second prism sheet 130 should almost completely overlap.

Referring to FIG. 1, in the embodiment, the backlight module 10 may optionally further include a first optical film 150 disposed between the light type adjustment sheet 160 and the first prism sheet 140. It depends on actual requirements whether the first optical film 150 is installed or not and the type of the first optical film 150. For example, in the embodiment, the first optical film 150 comprises a viewing angle control sheet (such as a louver film), a dual brightness enhancement film (DBEF), a diffusion sheet or a combination thereof, but the disclosure is not limited thereto.

Referring to FIG. 1, in the embodiment, the backlight module 10 may optionally further include a second optical film 120 disposed between the first prism sheet 140 and the light source 110. For example, in the embodiment, the second optical film 120 may be a diffusion sheet, but the disclosure is not limited thereto.

It should be noted here that the following embodiments use the component numbers and part of the content of the previous embodiments, wherein the same numbers are used to represent the same or similar components, and the descriptions of the same technical content are omitted. For the description of the omitted parts, reference may be made to the aforementioned embodiments, and repetitions are not made in the following embodiments.

Figure 6:
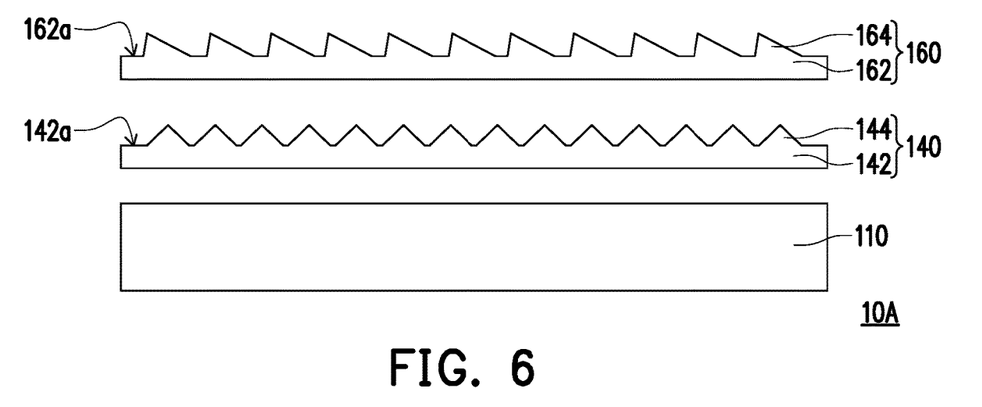
FIG. 6 is a schematic cross-sectional view of a backlight module according to the second embodiment of the disclosure.

FIG. 6 is a schematic cross-sectional view of a backlight module according to the second embodiment of the disclosure. A backlight module 10A of FIG. 6 is similar to the backlight module 10 of FIG. 1, and the difference between the two is that the backlight module 10A of FIG. 6 does not include the first optical film 150, the second prism sheet 130, and the second optical film 120 of the backlight module 10 of FIG. 1.

Figure 7:
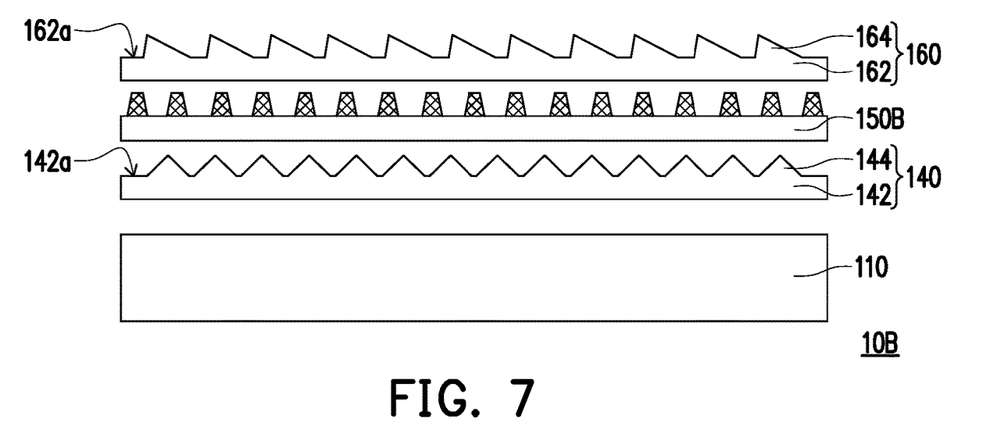
FIG. 7 is a schematic cross-sectional view of a backlight module according to the third embodiment of the disclosure.

FIG. 7 is a schematic cross-sectional view of a backlight module according to the third embodiment of the disclosure. A backlight module 10B of FIG. 7 is similar to the backlight module 10 of FIG. 1, and the difference between the two is that the backlight module 10B of FIG. 7 does not include the second prism sheet 130 and the second optical film 120 of the backlight module 10 of FIG. 1. In addition, in the embodiment shown in FIG. 7, a first optical film 150B of the backlight module 10B may be a viewing angle control sheet (such as a louver film). The first optical film 150B may shield the stray light with a large viewing angle from the first prism sheet 140, so that the viewing angle adjustment effect of the backlight module 10B is more favorable.

Figure 8:
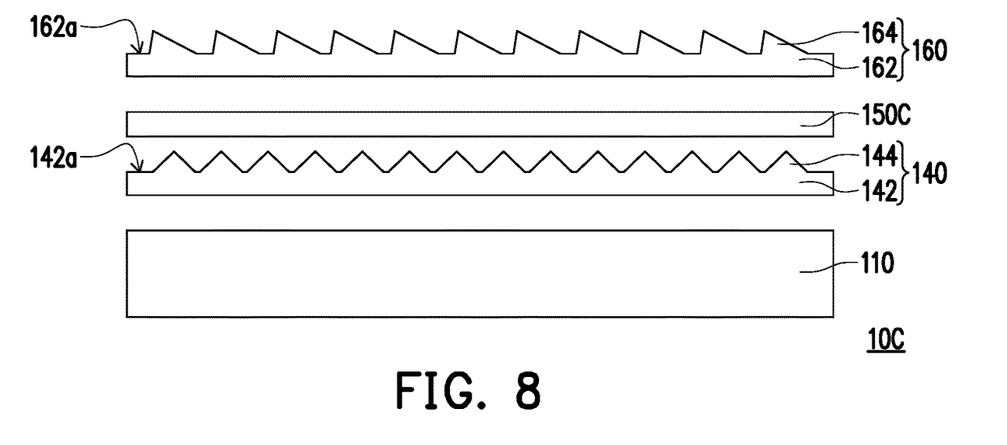
FIG. 8 is a schematic cross-sectional view of a backlight module according to the fourth embodiment of the disclosure.

FIG. 8 is a schematic cross-sectional view of a backlight module according to the fourth embodiment of the disclosure. A backlight module 10C of FIG. 8 is similar to the backlight module 10 of FIG. 1, and the difference between the two is that the backlight module 10C of FIG. 8 does not include the second prism sheet 130 and the second optical film 120 of the backlight module 10 of FIG. 1. In addition, in the embodiment of FIG. 8, a first optical film 150C of the backlight module 10C may be a dual brightness enhancement film (DBEF). The first optical film 150C may increase the brightness of the backlight module 10C, so that the backlight module 10C is suitable for applications which have higher brightness requirements.

Figure 9:
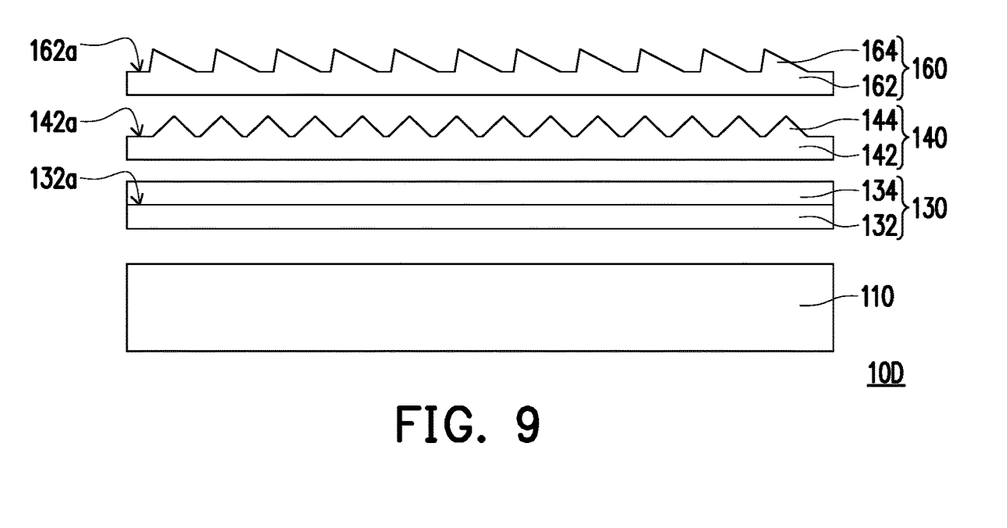
FIG. 9 is a schematic cross-sectional view of a backlight module according to the fifth embodiment of the disclosure.

FIG. 9 is a schematic cross-sectional view of a backlight module according to the fifth embodiment of the disclosure. A backlight module 10D of FIG. 9 is similar to the backlight module 10 of FIG. 1, and the difference between the two is that the backlight module 10D of FIG. 9 does not include the first optical film 150 and the second optical film 120 of the backlight module 10 of FIG. 1. The backlight module 10D of FIG. 9 may concentrate the light beam entering between the light type adjustment sheet 160 in the direction of the front viewing angle using the first prism sheet 140 and the second prism sheet 130, thereby making the front viewing brightness of the backlight module 10D more favorable.

Figure 10:
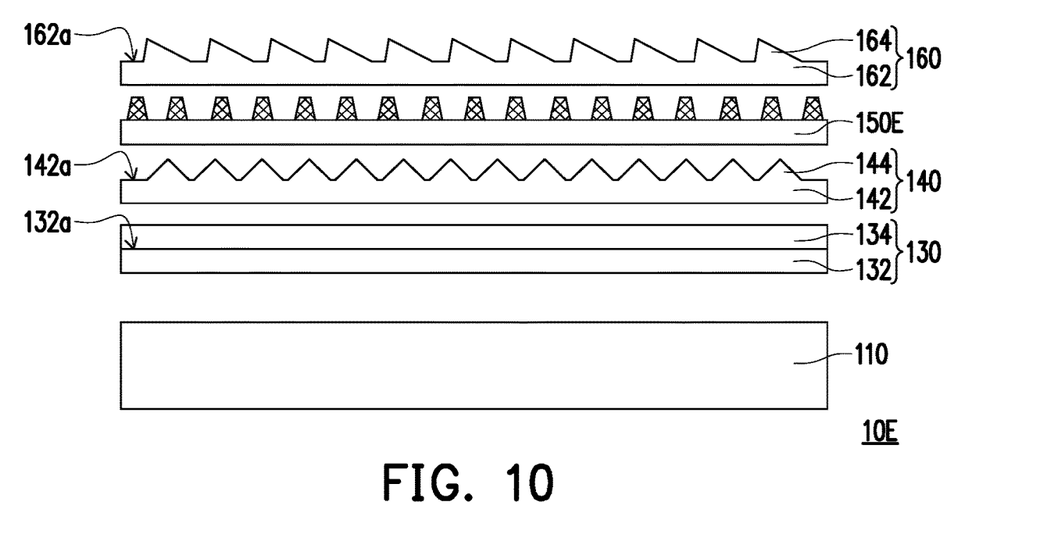
FIG. 10 is a schematic cross-sectional view of a backlight module according to the sixth embodiment of the disclosure.

FIG. 10 is a schematic cross-sectional view of a backlight module according to the sixth embodiment of the disclosure. A backlight module 10E of FIG. 10 is similar to the backlight module 10 of FIG. 1, and the difference between the two is that the backlight module 10E of FIG. 10 does not include the second optical film 120 of the backlight module 10 of FIG. 1. In the embodiment of FIG. 10, the first prism sheet 140 and the second prism sheet 130 are used to concentrate the light beam in the front viewing direction, then a first optical film 150E (such as a louver film) is used to shield the stray light with a large viewing angle, and finally the light type adjustment sheet 160 deflects the light beam in a specific direction, thereby realizing the function of adjusting the viewing angle. The backlight module 10E is suitable for applications which have high viewing angle requirements and need to maintain a certain level of front viewing brightness.

Figure 11:
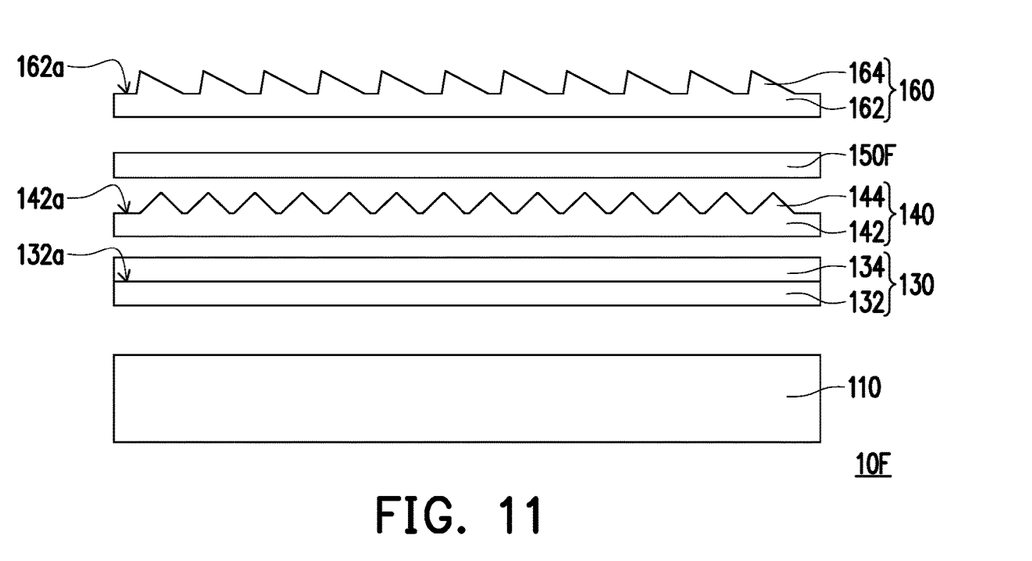
FIG. 11 is a schematic cross-sectional view of a backlight module according to the seventh embodiment of the disclosure.

FIG. 11 is a schematic cross-sectional view of a backlight module according to the seventh embodiment of the disclosure. A backlight module 10F in FIG. 11 is similar to the backlight module 10D of FIG. 9, and the difference between the two is that the backlight module 10F in FIG. 11 further includes a first optical film 150F disposed between the light type adjustment sheet 160 and the first prism sheet 140. In the embodiment of FIG. 11, the first optical film 150F of the backlight module 10F may be a dual brightness enhancement film (DBEF). Compared with the backlight module 10D of FIG. 9, the front viewing brightness of the backlight module 10F of FIG. 11 may be greatly improved by using the additional first optical film 150F.

Figure 12:
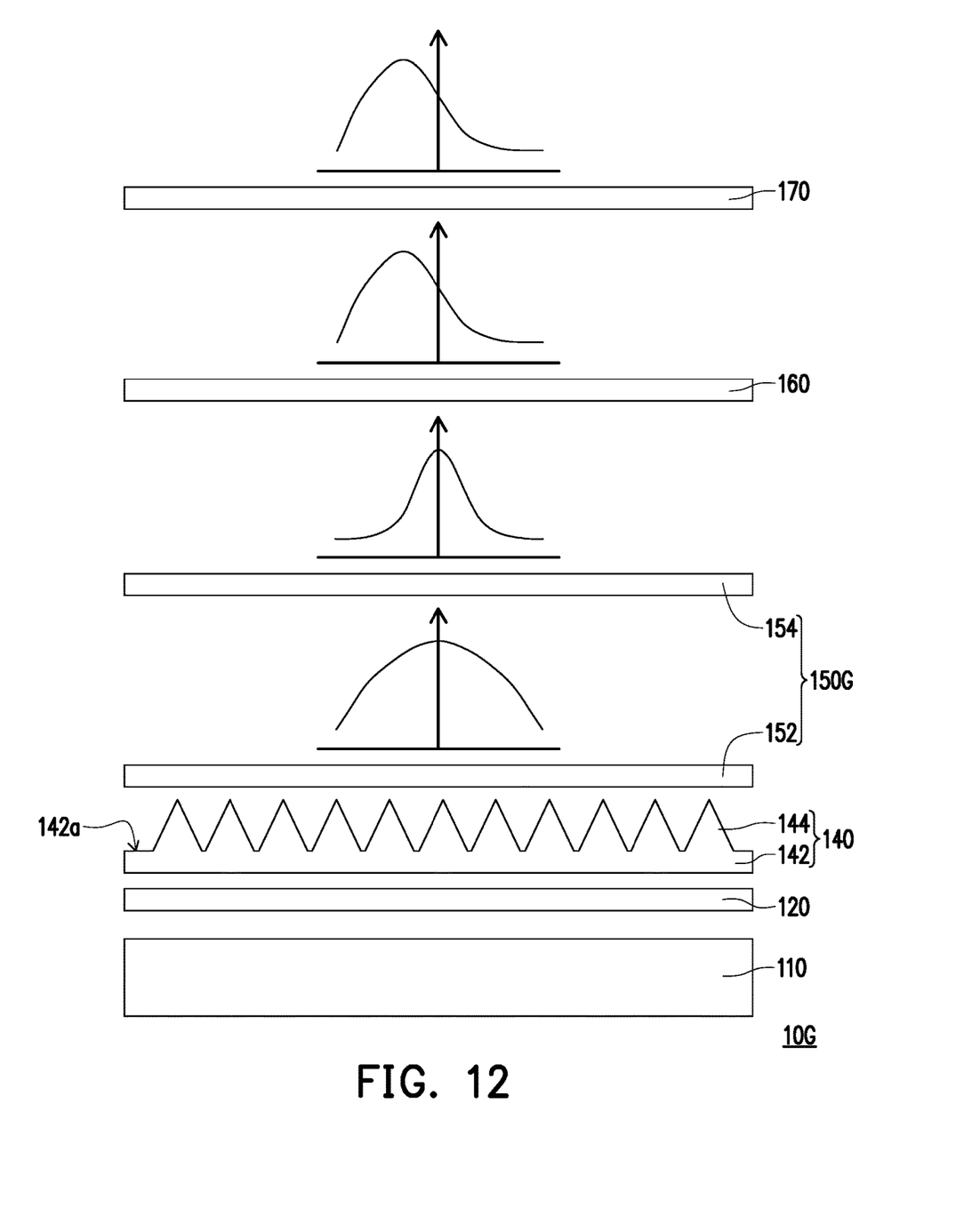
FIG. 12 is a schematic cross-sectional view of a backlight module according to the eighth embodiment of the disclosure and shows a light type change after a light beam passes through each component when an electronically controlled anti-peep sheet of a backlight module is in a sharing mode.

FIG. 12 is a schematic cross-sectional view of a backlight module according to the eighth embodiment of the disclosure. A backlight module 10G of FIG. 12 is similar to the backlight module 10 of FIG. 1, and the difference between the two is that the backlight module 10G of FIG. 12 does not include the second prism sheet 130 of the backlight module 10 of FIG. 1, and the backlight module 10G of FIG. 12 further includes an electronically controlled anti-peep sheet 170.

Referring to FIG. 12, in the embodiment, the light type adjustment sheet 160 is disposed between the electronically controlled anti-peep sheet 170 and the first prism sheet 140. The electronically controlled anti-peep sheet 170 may be switched between the sharing mode and the anti-peep mode. After the light beam passes through the electronically controlled anti-peep sheet 170 in the sharing mode, the light type of the light beam remains substantially unchanged. When the light beam passes through the electronically controlled anti-peep sheet 170 in the anti-peep mode, the components of the light beam incident at a large viewing angle are blocked by the electronically controlled anti-peep sheet 170, and the components of the light beam incident at an angle close to or equal to the front viewing angle may pass through the electronically controlled anti-peep sheet 170.

Figure 13:
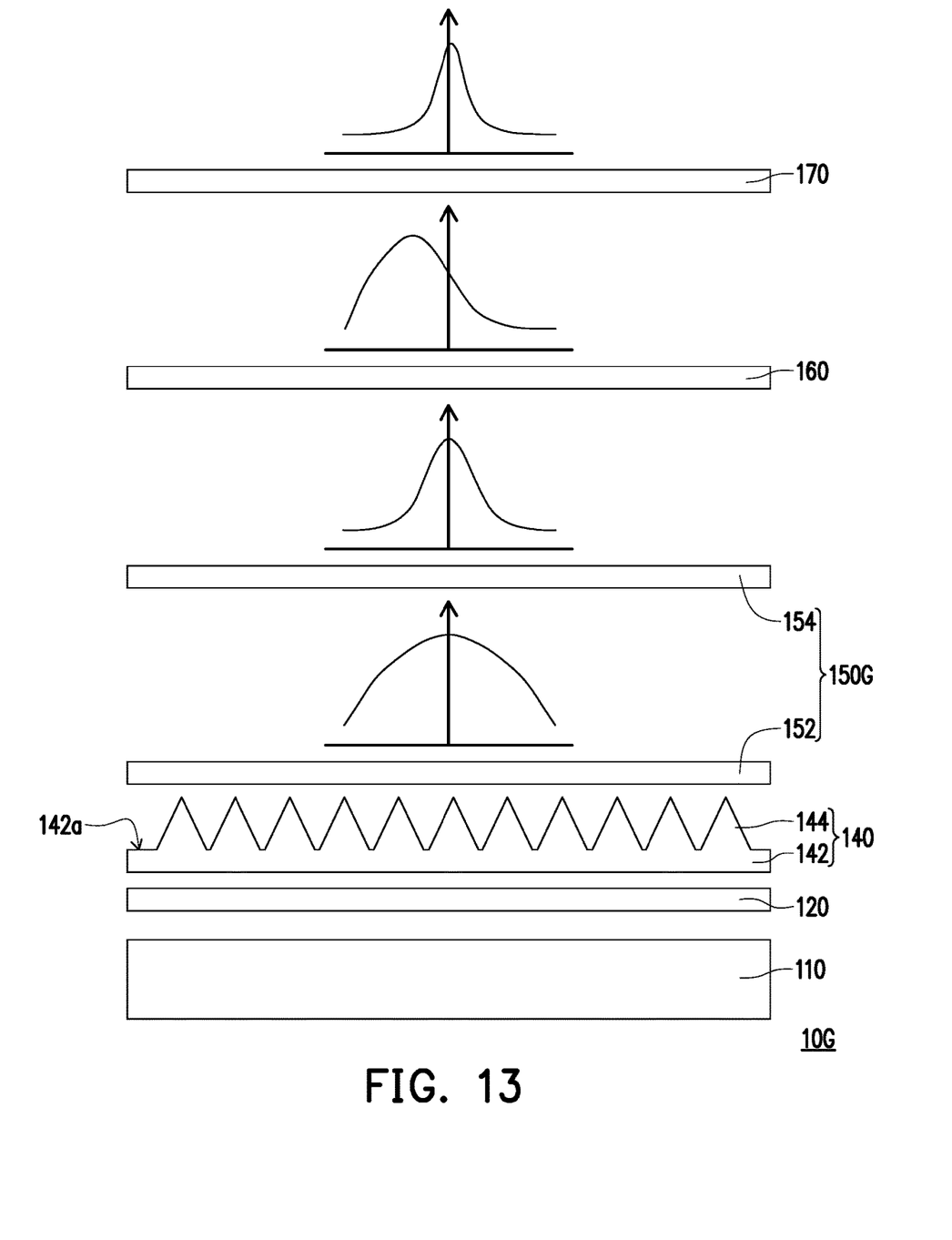
FIG. 13 shows a light type change after a light beam passes through each component when an electronically controlled anti-peep sheet of the backlight module in FIG. 12 is in an anti-peep mode.

FIG. 12 shows a light type change after a light beam passes through each component when the electronically controlled anti-peep sheet 170 of the backlight module 10G is in a sharing mode. FIG. 13 shows a light type change after a light beam passes through each component when the electronically controlled anti-peep sheet 170 of the backlight module 10G of FIG. 12 is in an anti-peep mode.

Referring to FIG. 12, in the embodiment, a first optical film 150G includes a first diffusion sheet 152 and an anti-peep sheet 154 (such as a louver film), and the first diffusion sheet 152 is disposed between the anti-peep sheet 154 and the first prism sheet 140. The light beam from the first diffusion sheet 152 has a light type that diverges in various directions. The light beam from the first diffusion sheet 152 has a concentrated and symmetrical light type toward the front viewing direction after passing through the anti-peep sheet 154. The light beam from the anti-peep sheet 154 passes through the light type adjustment sheet 160 and is deflected in a specific direction (e.g., left side) to have an asymmetrical light type. After passing through the electronically controlled anti-peep sheet 170 in the sharing mode, the light type of the light beam from the light type adjustment sheet 160 remains substantially unchanged, and still has an asymmetrical light type concentrated in a specific direction (e.g., left side).

Referring to FIG. 13, the light beam from the first diffusion sheet 152 has a light type that diverges in various directions. The light beam from the first diffusion sheet 152 has a concentrated and symmetrical light type toward the front viewing direction after passing through the anti-peep sheet 154. The light beam from the anti-peep sheet 154 passes through the light type adjustment sheet 160 and is deflected in a specific direction (e.g., left side) to have an asymmetrical light type. When the light beam from the light type adjustment sheet 160 passes through the electronically controlled anti-peep sheet 170 in the anti-peep mode, the components incident at a large viewing angle are blocked, so that the light beam is concentrated in the front viewing direction after passing through the electronically controlled anti-peep sheet 170.

Referring to FIG. 12 and FIG. 13, for example, in the embodiment, the backlight module 10G may be applied to a vehicle-mounted display device. After the light beam having a wide viewing angle light type passes through the anti-peep sheet 154, the components of the large viewing angle are blocked and may not pass through the anti-peep sheet 154, and the light beam passing through the anti-peep sheet 154 has a concentrated and symmetrical light type toward the front viewing direction. The light beam passing through the anti-peep sheet 154 is then deflected by the light type adjustment sheet 160. The light type of the light beam becomes shifted toward the left side (or in other words, the driver's side), and the amount of light transmitted toward the right side (or in other words, the passenger's window side) is reduced. Afterwards, the amount of the light transmitted toward the left side (or in other words, the driver's side) is controlled by the switch of the electronically controlled anti-peep sheet 170. When the electronically controlled anti-peep sheet 170 is turned off, the light beam transmitted toward the left side (or in other words, the driver's side) is not blocked, and the sharing mode is present. When the electronically controlled anti-peep sheet 170 is switched to the anti-peep mode, the light beam transmitted toward the left side (or in other words, the driver's side) is blocked, and the anti-peep mode is present.

For example, in the embodiment, the electronically controlled anti-peep sheet 170 may include a liquid crystal panel (not shown), a compensation film (not shown), a first polarizer (not shown), and a second polarizer (not shown). The liquid crystal panel includes two light-transmitting conductive layers and multiple liquid crystal molecules located between the two light-transmitting conductive layers. The compensation film is overlapped with the liquid crystal panel, and the compensation film is located between the first polarizer and the liquid crystal panel. The second polarizer is located on one side of the liquid crystal panel, the compensation film, and the first polarizer. When there is no potential difference between the two light-transmitting conductive layers (that is, when the electronically controlled anti-peep sheet 170 is turned off), the optical axes of the multiple liquid crystal molecules are parallel to or perpendicular to the transmission axis of the first polarizer. When there is a potential difference between the two light-transmitting conductive layers (that is, when the electronically controlled anti-peep sheet 170 is turned on), the optical axes of the multiple liquid crystal molecules are inclined relative to the transmission axis or the absorption axis of the first polarizer. The compensation film may be selected from one of the group consisting of an O-type plate and a C-type plate. The transmission axis of the second polarizer is parallel to the transmission axis of the first polarizer.

It should be noted that the above-mentioned structure of the electronically controlled anti-peep sheet 170 is only used to illustrate the disclosure, but not to limit the disclosure. In other embodiments, the electronically controlled anti-peep sheet 170 may also be of other structures, and any electronically controlled anti-peep sheet that may be switched between the anti-peep mode and the sharing mode is within the scope of protection of the disclosure.

To sum up, the backlight module of an embodiment of the disclosure uses the combination of the first prism sheet and the light type adjustment sheet to direct the light beam to a specific direction, so as to achieve the function of adjusting the viewing angle. It is worth mentioning that the first prism sheet and the light type adjustment sheet use the refraction of the light beam to achieve the purpose of adjusting the viewing angle without using a light-shielding structure. Therefore, while adjusting the viewing angle by using the first prism sheet and the light type adjustment sheet, the brightness of the backlight module is not significantly lost, and the problem of large chromaticity shift is unlikely to occur.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module comprising: a light source module; a first prism sheet, disposed on the light source module; and a light type adjustment sheet, disposed on a side of the first prism sheet away from the light source module, wherein the light type adjustment sheet comprises: a base, having a first surface away from the light source module and a second surface close to the light source module; and a plurality of light type adjustment structures, disposed on the first surface of the base, wherein each of the plurality of light type adjustment structures has a first structure surface and a second structure surface connected to each other, the first structure surface of each of the plurality of light type adjustment structures and the first surface of the base form a first base angle therebetween, the second structure surface of each of the plurality of light type adjustment structures and the first surface of the base form a second base angle therebetween, and an angle of the first base angle is different from an angle of the second base angle, wherein the angle of the second base angle is smaller than the angle of the first base angle, and the first base angle of each of the plurality of light type adjustment structures is located on the same side of each of the plurality of light type adjustment structures.

2. The backlight module according to claim 1, wherein a surface of the first prism sheet away from the light source module has a plurality of first prism structures, an extending direction of the plurality of first prism structures of the first prism sheet and an extending direction of the plurality of light type adjustment structures of the light type adjustment sheet form a first included angle there between, and an angle of the first included angle is in a range of 0° to 180°.

3. The backlight module according to claim 2, further comprising: a second prism sheet, disposed between the first prism sheet and the light source module, wherein a surface of the second prism sheet away from the light source module has a plurality of second prism structures, the extending direction of the plurality of first prism structures of the first prism sheet and an extending direction of the plurality of second prism structures of the second prism sheet form a second included angle therebetween, and an angle of the second included angle is in a range of 0° to 180°.

4. The backlight module according to claim 3, further comprising:
a first optical film, disposed between the light type adjustment sheet and the first prism sheet.

5. The backlight module according to claim 4, wherein the first optical film comprises a viewing angle control sheet, a dual brightness enhancement film (DBEF), a diffusion sheet or a combination thereof.

6. The backlight module according to claim 3, further comprising: a second optical film, disposed between the first prism sheet and the light source module.

7. The backlight module according to claim 6, wherein the second optical film is a diffusion sheet.

8. The backlight module according to claim 3, wherein the angle of the second included angle is equal to 90°.

9. The backlight module according to claim 2, wherein the angle of the first included angle is equal to 45°.

10. The backlight module according to claim 1, wherein the plurality of light type adjustment structures are arranged with a distance in a direction, each of the plurality of light type adjustment structures has a width in the direction, and the ratio of the distance to the width is in a range of 0 to 1.

11. The backlight module according to claim 10, wherein the width is between 40 µm and 150 µm.

12. The backlight module according to claim 11, wherein the width is equal to 88 µm.

13. The backlight module according to claim 1, wherein the angle of the first base angle is in a range of 70° to 90°, and the angle of the second base angle is in a range of 10° to 30°.

14. The backlight module according to claim 13, wherein the angle of the first base angle is equal to 87°, and the angle of the second base angle is equal to 23°.

15. The backlight module according to claim 1, wherein the first structure surface and the second structure surface form a first vertex angle therebetween, and an angle of the first vertex angle is in a range of 60° to 100°.

16. The backlight module according to claim 15, wherein the angle of the first vertex is equal to 70°.

17. The backlight module according to claim 1, further comprising:
a first optical film, disposed between the light type adjustment sheet and the first prism sheet.

18. The backlight module according to claim 17, wherein the first optical film comprises a viewing angle control sheet, a dual brightness enhancement film (DBEF), a diffusion sheet or a combination thereof.

19. The backlight module according to claim 1, further comprising: a second optical film, disposed between the first prism sheet and the light source module.

20. The backlight module according to claim 19, wherein the second optical film is a diffusion sheet.

21. The backlight module according to claim 1, wherein a first projected area of the first structure surface of the light type adjustment structure on the first surface of the base is smaller than a second projected area of the second structure surface of the light type adjustment structure on the first surface of the base.

22. The backlight module according to claim 1, further comprising:
an electronically controlled anti-peep sheet, wherein the light type adjustment sheet is disposed between the electronically controlled anti-peep sheet and the first prism sheet.

* * * * *